United States Patent
Iwai et al.

(10) Patent No.: US 11,641,628 B2
(45) Date of Patent: May 2, 2023

(54) TERMINAL AND COMMUNICATION METHOD

(71) Applicant: Panasonic Intellectual Property Corporation of America, Torrance, CA (US)

(72) Inventors: Takashi Iwai, Ishikawa (JP); Hidetoshi Suzuki, Kanagawa (JP); Tomohumi Takata, Ishikawa (JP); Tetsuya Yamamoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/606,395

(22) PCT Filed: Apr. 17, 2018

(86) PCT No.: PCT/JP2018/015792
§ 371 (c)(1),
(2) Date: Oct. 18, 2019

(87) PCT Pub. No.: WO2018/230138
PCT Pub. Date: Dec. 20, 2018

(65) Prior Publication Data
US 2020/0044805 A1    Feb. 6, 2020

(30) Foreign Application Priority Data

Jun. 15, 2017   (JP) .............................. JP2017-117639

(51) Int. Cl.
*H04W 52/32*   (2009.01)
*H04L 5/00*    (2006.01)
(Continued)

(52) U.S. Cl.
CPC ......... *H04W 52/325* (2013.01); *H04L 5/0048* (2013.01); *H04L 5/0051* (2013.01);
(Continued)

(58) Field of Classification Search
CPC .. H04J 13/14; H04L 27/2613; H04L 27/2614; H04L 5/0048; H04L 5/0051;
(Continued)

(56) References Cited

U.S. PATENT DOCUMENTS 6,970,193 B1 *  11/2005  Kidono .................. H04N 5/343
                                                      348/241
2008/0144073 A1 *  6/2008  Griesemer ............. G03G 15/50
                                                      358/1.15
(Continued)

FOREIGN PATENT DOCUMENTS

JP    2011-142550 A    7/2011
JP    2013-507062 A    2/2013
(Continued)

OTHER PUBLICATIONS

International Search Report of PCT application No. PCT/JP2018/015792 dated Jul. 24, 2018.
(Continued)

*Primary Examiner* — Khaled M Kassim
(74) *Attorney, Agent, or Firm* — Seed IP Law Group LLP (57) ABSTRACT

In a terminal, a selecting unit selects one generation method from a plurality of generation methods for reference signals (sounding reference signals (SRSs)). A radio transmitting unit transmits reference signals (SRSs) generated in accordance with the selected generation method.

14 Claims, 7 Drawing Sheets

(51) Int. Cl.
  *H04W 52/24* (2009.01)
  *H04W 52/36* (2009.01)
  *H04W 72/0453* (2023.01)
  *H04L 27/26* (2006.01)
  *H04W 72/542* (2023.01)

(52) U.S. Cl.
  CPC ....... *H04L 27/2613* (2013.01); *H04W 52/242* (2013.01); *H04W 52/365* (2013.01); *H04W 72/0453* (2013.01); *H04W 72/542* (2023.01)

(58) Field of Classification Search
  CPC ............. H04W 52/242; H04W 52/325; H04W 52/365; H04W 52/367; H04W 72/0453; H04W 72/085
  See application file for complete search history.

(56) References Cited

U.S. PATENT DOCUMENTS

| | | | |
|---|---|---|---|
| 2009/0306844 A1* | 12/2009 | Arita | H04B 3/54 |
| | | | 701/31.4 |
| 2010/0067591 A1* | 3/2010 | Luo | H04L 1/0028 |
| | | | 375/260 |
| 2010/0120370 A1* | 5/2010 | Ishii | H04B 17/309 |
| | | | 455/67.11 |
| 2011/0096815 A1 | 4/2011 | Shin et al. | |
| 2013/0012252 A1 | 1/2013 | Suzuki et al. | |
| 2013/0078913 A1* | 3/2013 | Lee | H04W 52/146 |
| | | | 455/39 |
| 2013/0114536 A1* | 5/2013 | Yoon | H04L 27/2613 |
| | | | 370/329 |
| 2013/0155992 A1* | 6/2013 | Yoon | H04L 5/0023 |
| | | | 370/329 |
| 2013/0230018 A1* | 9/2013 | Yagi | H04B 7/12 |
| | | | 370/330 |
| 2013/0343294 A1 | 12/2013 | Ogawa et al. | |
| 2014/0086093 A1* | 3/2014 | Liu | H04W 24/02 |
| | | | 370/252 |
| 2014/0086205 A1* | 3/2014 | Nakasato | H04W 72/044 |
| | | | 370/330 |
| 2014/0211737 A1 | 7/2014 | Takeda et al. | |
| 2015/0236882 A1* | 8/2015 | Bertrand | H04L 25/022 |
| | | | 370/329 |
| 2015/0327244 A1* | 11/2015 | Pajukoski | H04L 5/0003 |
| | | | 370/330 |
| 2017/0026919 A1 | 1/2017 | Takeda et al. | |
| 2017/0215107 A1 | 7/2017 | Kakishima et al. | |
| 2018/0254868 A1 | 9/2018 | Saito et al. | |
| 2019/0045458 A1* | 2/2019 | Harada | H04W 72/08 |
| 2019/0238367 A1* | 8/2019 | Lei | H04L 27/227 |
| 2020/0036493 A1* | 1/2020 | Choi | H04L 5/0051 |
| 2020/0092055 A1* | 3/2020 | Choi | H04L 5/0091 |

FOREIGN PATENT DOCUMENTS

| | | |
|---|---|---|
| JP | 2017-038406 | 2/2017 |
| WO | 2009/019878 | 2/2009 |
| WO | 2013/051206 A1 | 4/2013 |
| WO | 2016/017705 | 2/2016 |
| WO | 2017/090708 | 6/2017 |

OTHER PUBLICATIONS

R1-1708171, "UL SRS sequence design in NR", 3GPP TSG RAN WG1 Meeting #89, May 2017.
R1-1708085, "Discussion on SRS transmission for NR", 3GPP TSG RAN WG1 Meeting #89, May 2017.
3GPP TSG RAN WG1 Meeting #89, "RAN1 Chairman's Notes", May 2017.
R1-1706897, "Updated simulation results on ECP", 3GPP TSG RAN WG1 Meeting #89, May 2017.
R1-1707274, "On DL DMRS design for NR", 3GPP TSG RAN WG1 Meeting #89, May 2017.

* cited by examiner

TERMINAL AND COMMUNICATION METHOD

TECHNICAL FIELD

The present disclosure relates to a terminal and a communication method.

BACKGROUND ART

For standardization of 5G, a new radio access technology (New Radio (NR)) that does not necessarily have backward compatibility with LTE/LTE-Advanced has been discussed by 3GPP.

In LTE, a terminal (also referred to as user equipment (UE)) transmits reference signals referred to as sounding reference signals (hereinafter referred to as "SRSs") by using a radio resource allocated by a base station (also referred to as an "eNB" or a "gNB"). The base station can estimate the uplink quality in the SRS transmission band by measuring the reception quality of the SRSs. The base station performs frequency scheduling or link adaptation (adaptive modulation and coding) for the terminal by using an estimated value of the uplink quality.

SRS transmission, which is adopted in LTE, has been studied for NR. It was agreed that Zadoff-Chu (ZC) sequences, which are advantageous in having a low cubic metric/peak to average power ratio (CM/PAPR) and good cross-correlation properties, would be used for SRSs in NR, as have been used in LTE (see, for example, NPL 1).

CITATION LIST

Non Patent Literature

NPL 1: 3GPP RAN1#89 Chairman's note
NPL 2: R1-1708171, Huawei, HiSilicon, "UL SRS sequence design in NR", RAN1#89, May 2017
NPL 3: R1-1708085, Panasonic, "Discussion on SRS transmission for NR", RAN1#89, May 2017

SUMMARY OF INVENTION

However, methods for generating SRSs in NR have not been studied thoroughly.

An embodiment of the present disclosure facilitates providing a terminal capable of appropriately generating SRSs and a communication method.

A terminal according to an embodiment of the present disclosure includes: a circuit configured to select one generation method from a plurality of generation methods for reference signals; and a transmitter configured to transmit the reference signals generated in accordance with the selected generation method.

A communication method according to an embodiment of the present disclosure includes: selecting one generation method from a plurality of generation methods for reference signals; and transmitting the reference signals generated in accordance with the selected generation method.

It should be noted that these general or specific embodiments may be implemented as a system, a device, a method, an integrated circuit, a computer program, or a recording medium, and may be implemented as any combination of a system, a device, a method, an integrated circuit, a computer program, and a recoding medium.

According to an embodiment of the present disclosure, SRSs can be appropriately generated.

Additional advantages and effects of an embodiment of the present disclosure will become apparent from the specification and the drawings. The advantages and/or effects may be individually obtained by some embodiments and features described in the specification and the drawings, which need not all be provided to obtain one or more of the features.

DESCRIPTION OF EMBODIMENTS

Hereinafter, embodiments of the present disclosure will be described with reference to the drawings.

The following two methods for generating SRS sequences in NR have been studied (see, for example, NPL 1). A physical resource block (PRB) refers to a time/frequency resource allocation unit.

(1) Generation Method 1 (also referred to as "Alt-1"):

The SRS sequence generation is not a function of the allocated PRB position.

(2) Generation Method 2 (also referred to as "Alt-2"):

The SRS sequence generation is a function of the allocated PRB position.

Figure 1:
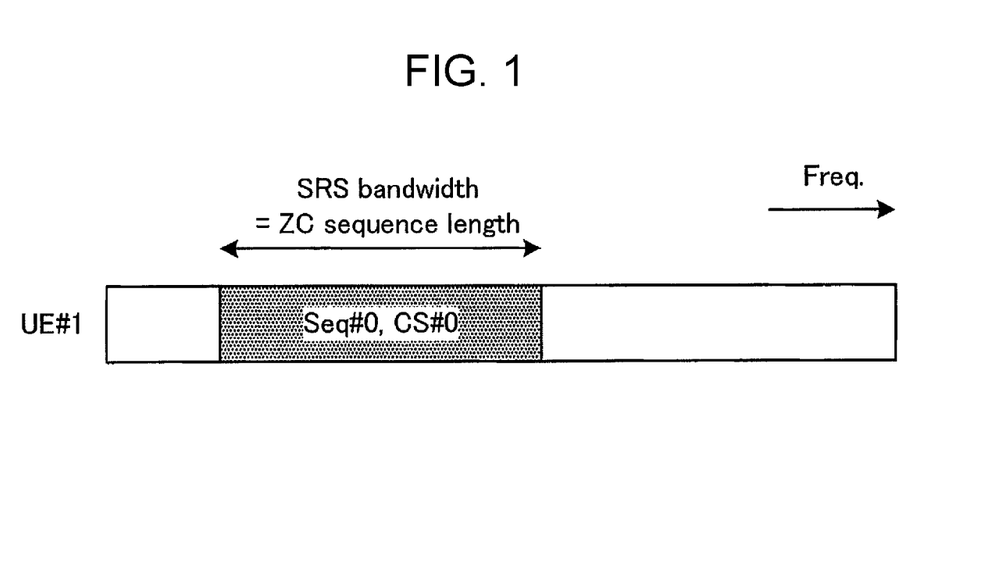
FIG. 1 illustrates an example of SRS Generation Method 1.

FIG. 1 illustrates an example of SRSs generated in accordance with Generation Method 1 (Alt-1) (see, for example, NPL 2). According to Generation Method 1, an SRS is generated by using one ZC sequence, as is an SRS for LTE. The ZC sequence is generated from a given sequence number (Seq#0 in FIG. 1) and a given cyclic shift (CS) number (CS#0 in FIG. 1), and the sequence length of the ZC sequence corresponds to the SRS transmission bandwidth. Thus, according to Generation Method 1, the SRS sequence generation is not dependent on the allocated PRB position but is dependent on the SRS transmission bandwidth.

Figure 2:
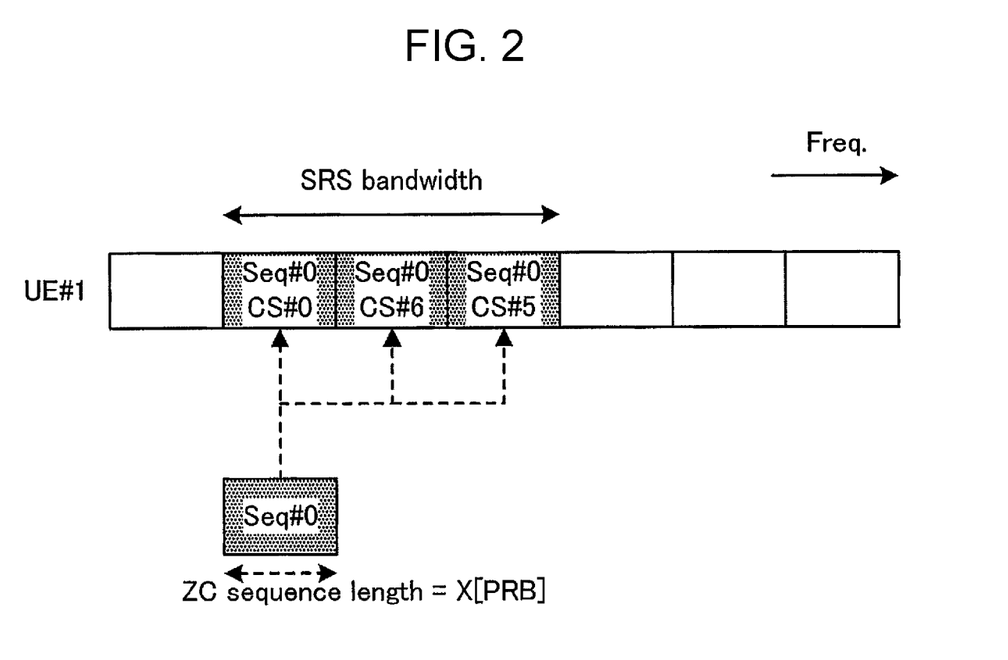
FIG. 2 illustrates an example of SRS Generation Method 2.

FIG. 2 illustrates an example of SRSs generated in accordance with Generation Method 2 (Alt-2) (see, for example, NPL 3). According to Generation Method 2, an SRS is generated by using one or more ZC sequences. Specifically, the SRSs are allocated in units of frequency blocks defined within an NR carrier (a system band of NR) and having a certain bandwidth X[PRB]. That is, the SRS transmission bandwidth is an integral multiple of X[PRB]. The sequence number and the CS number of each ZC sequence used in a corresponding frequency block are assigned in accordance with a predetermined rule, and ZC sequences are generated for corresponding frequency blocks. Thus, according to Generation Method 2, the SRS sequence generation is not dependent on the SRS transmission bandwidth but is dependent on the allocated PRB position (frequency block).

The above-mentioned SRS Generation Methods 1 and 2 that have been discussed in relation to NR involve a trade-off between the cubic metric/peak to average power ratio (CM/PAPR) property and flexibility in frequency scheduling.

Specifically, Generation Method 1 has an advantage that the CM/PAPR is low due to the use of one ZC sequence in the SRS generation.

Figure 3:
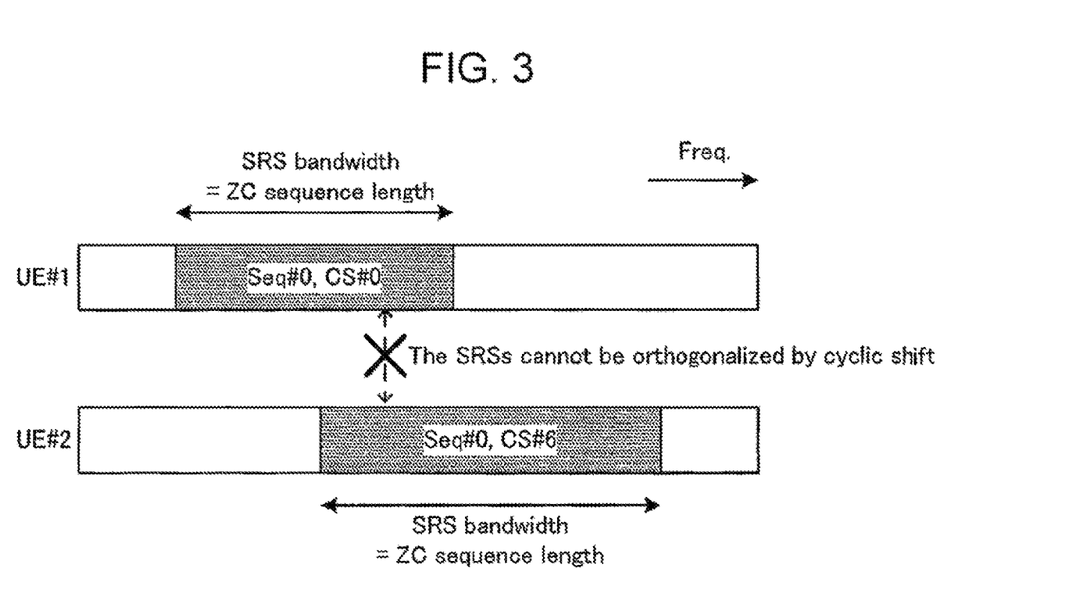
FIG. 3 illustrates an example of multiplexing of a partial band between SRSs according to SRS Generation Method 1.

According to Generation Method 1, however, even with different CS numbers assigned to different terminals (UE#1 and UE#2), any disagreement between SRS transmission bands of the terminals causes loss of orthogonality between SRSs transmitted by the terminals as indicated in FIG. 3, resulting in interference which may deteriorate the accuracy of the uplink quality estimation done by the base station. To keep the orthogonality between the SRSs, Generation Method 1 thus requires that the SRS transmission bandwidth and the transmission band position of one terminal be in agreement with those of the other terminal. This may reduce the flexibility in the SRS frequency scheduling done by the base station. Such a constraint on the frequency scheduling is a demerit because a greater number of terminals and a wider variety of terminals (terminals having various kinds of capability/category and provided with varying terminal capability and functions associated with, for example, the band available for use in transmission) are to be supported by NR than by LTE.

Figure 4:
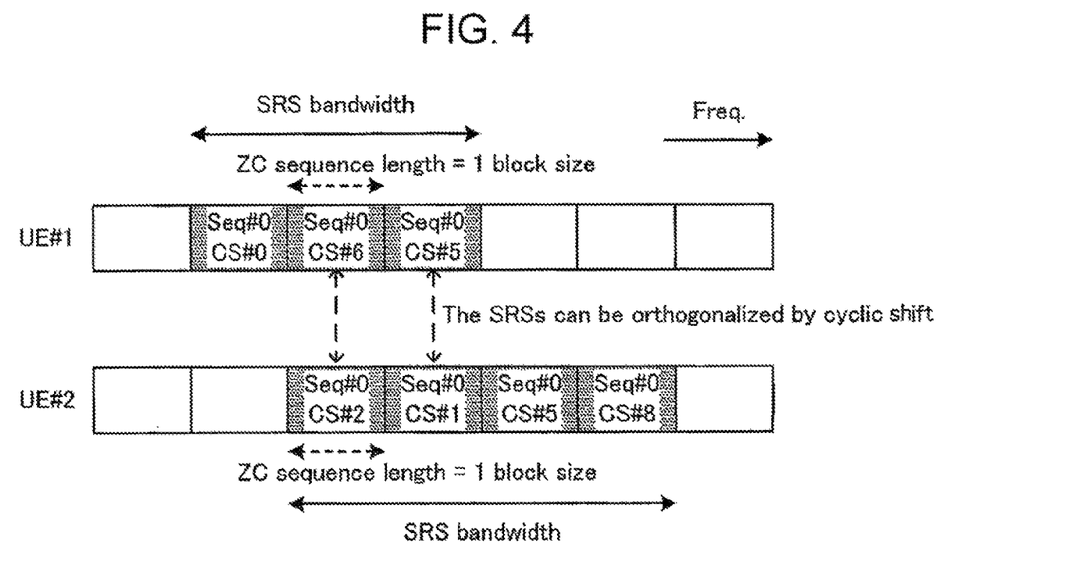
FIG. 4 illustrates an example of multiplexing of a partial band between SRSs according to SRS Generation Method 2.

Meanwhile, as illustrated in FIG. 4, Generation Method 2 involves the assignment of sequence numbers and CS numbers and the ZC sequence generation in units of frequency blocks common to a plurality of terminals (UE#1 and UE#2). Thus, according to Generation Method 2, SRSs of the plurality of terminals may be orthogonalized in units of frequency blocks even if there is disagreement between the SRS transmission bands of the terminals. That is, use of SRSs generated in accordance with Generation Method 2 enables the base station to assign desired SRS transmission bandwidths and transmission band positions to individual terminals. Accordingly, Generation Method 2 is advantageous in that it offers a high degree of flexibility in frequency scheduling.

Generation Method 2 is, however, disadvantageous in that the CM/PAPR is high because a plurality of ZC sequences are concatenated to generate an SRS when the SRS transmission bandwidth is wider than X[PRB] of the frequency block unit (ZC sequence length).

Each terminal, in which a power amplifier of a transmitter is operated in the linear region, is thus required to lower the maximum transmission power in accordance with the CM/PAPR. That is, the maximum transmission power available for transmission may be smaller in a terminal with SRSs of higher CM/PAPR. With regard to the use of SRSs generated in accordance with Generation Method 2, there is concern about the possibility that, when performing transmission, many terminals (also referred to as "power-limited terminals") adjacent to the cell edge, for example, may fail to attain the transmission power requested (specified) by the base station. Since the level to which each terminal lowers its maximum transmission power in accordance with the CM/PAPR varies depending on the mounting of the transmitter of the terminal concerned, it is difficult for the base station to ascertain the actual maximum transmission power of such a power-limited terminal. Consequently, with SRSs transmitted by the power-limited terminal, the base station may not be able to estimate the uplink quality accurately. Meanwhile, terminals that do not lower the maximum transmission power in accordance with the CM/PAPR in the above-mentioned manner consume a greater amount of power when transmitting signals of higher CM/PAPR, and thus the life of a battery of such a terminal may be shortened.

As described above, Generation Method 1 has an advantage that the CM/PAPR is low, but has a problem that the degree of flexibility in frequency scheduling is low, whereas Generation Method 2 has an advantage that the degree of flexibility in frequency scheduling is high, but has a problem that the CM/PAPR is also high.

In an embodiment of the present disclosure, a method for efficiently generating SRSs will be described.

[Overview of Communication System]

A communication system according to an embodiment of the present disclosure includes a terminal 100 and a base station 200.

Figure 5:
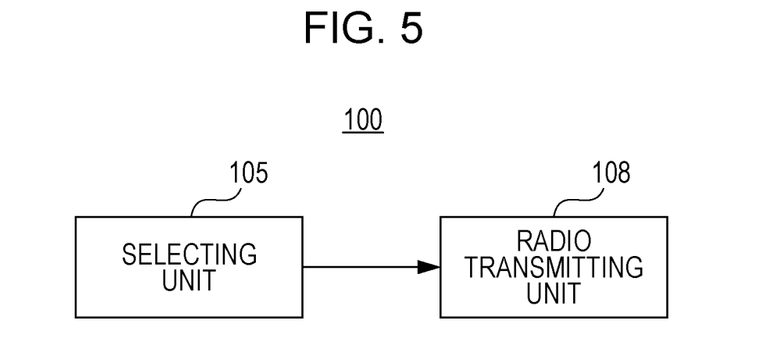
FIG. 5 illustrates a configuration of part of a terminal.

FIG. 5 is a block diagram illustrating the configuration of part of the terminal 100 according to the embodiment of the present disclosure. In the terminal 100 illustrated in FIG. 5, a selecting unit 105 selects one generation method from a plurality of generation methods for reference signals (SRSs). A radio transmitting unit 108 transmits reference signals (SRSs) generated in accordance with the selected generation method.

[Terminal Configuration]

Figure 6:
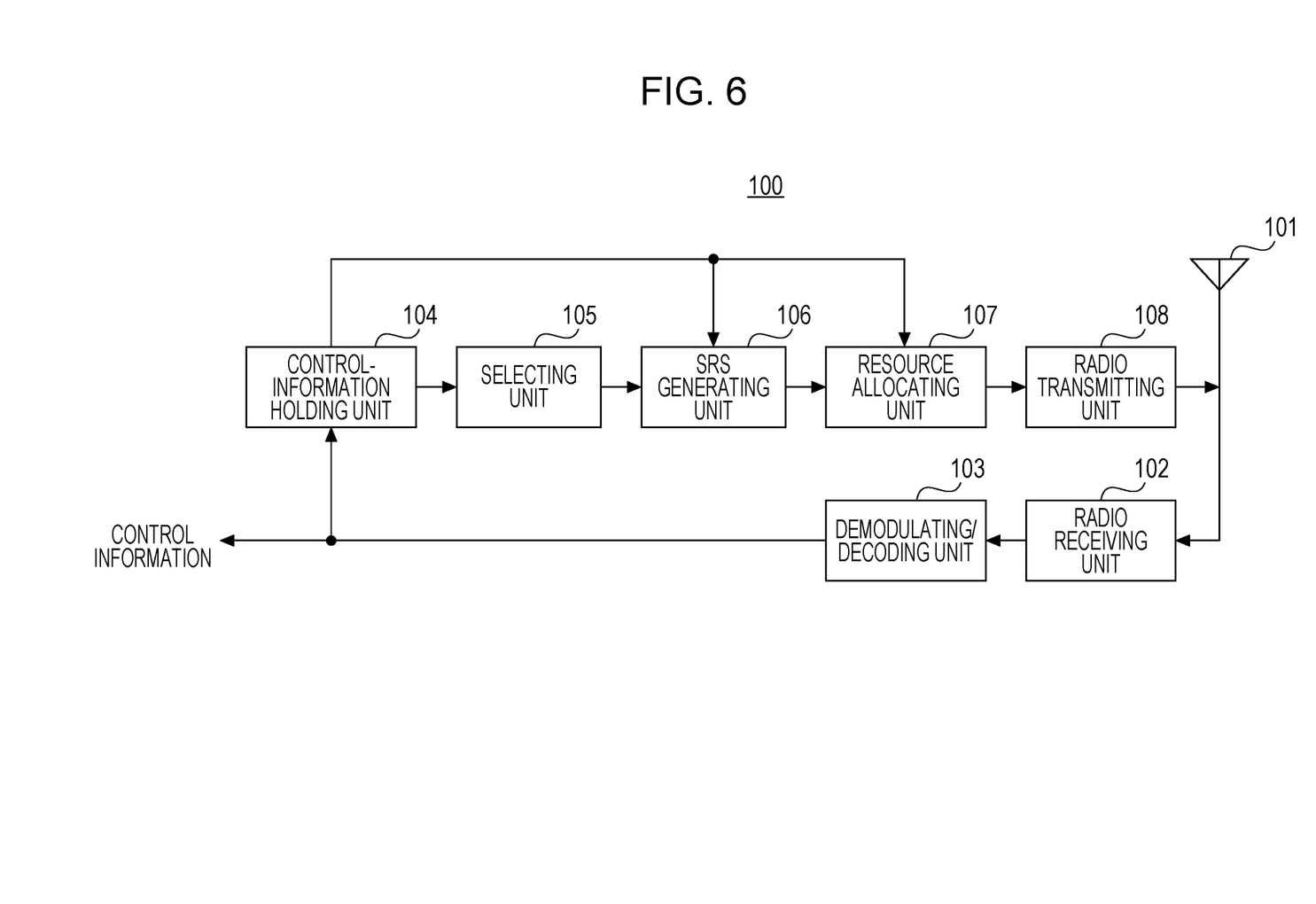
FIG. 6 illustrates a configuration of the terminal.

FIG. 6 is a block diagram illustrating the configuration of the terminal 100 according to the present embodiment. Referring to FIG. 6, the terminal 100 includes an antenna 101, a radio receiving unit 102, a demodulating/decoding unit 103, a control-information holding unit 104, the selecting unit 105, an SRS generating unit 106, a resource allocating unit 107, and the radio transmitting unit 108.

The radio receiving unit 102 performs reception processing such as down-conversion and ND conversion on a reception signal received via the antenna 101 and outputs the resulting reception signal to the demodulating/decoding unit 103.

The demodulating/decoding unit 103 demodulates and decodes the reception signal input from the radio receiving unit 102 and retrieves, from results of the decoding, information transmitted from the base station 200 to the terminal 100, for example, SRS resource information and control information for deciding on an SRS transmission method. The demodulating/decoding unit 103 outputs the retrieved information to the control-information holding unit 104 and other constituent units (not shown).

The SRS resource information includes information associated with the SRS transmission from the terminal 100, such as frequency resource information (e.g., the SRS transmission bandwidth and the transmission band position (PRB numbers, block numbers, etc.)), time resource information (e.g., slot numbers, orthogonal frequency division multiplexing (OFDM) symbol numbers, etc. associated with the SRS transmission), and code sequence information (e.g., sequence lengths, sequence numbers, and CS numbers of a predetermined number of ZC sequences). It is not always required that the entirety of the SRS resource information be provided to the terminal 100 all at once. For example, part of the SRS resource information may be provided to the terminal 100 as cell common information or quasi-static notification information. Alternatively, part of the SRS resource information may, for example, be prescribed by the specifications as system common information and does not need be provided to the terminal 100.

The control-information holding unit 104 holds the information input from the demodulating/decoding unit 103. The control information held by the control-information holding unit 104 includes quasi-static control information and dynamic control. The control-information holding unit 104 outputs the held control information to the selecting unit 105, the SRS generating unit 106, or the resource allocating unit 107, as required.

The selecting unit 105 selects one SRS generation method to be adopted, that is, Generation Method 1 (Alt-1) or Generation Method 2 (Alt-2) described above, on the basis of the control information input from the control-information holding unit 104. The selecting unit 105 outputs information specifying the selected generation method to the SRS generating unit 106. Details on the procedure by which the selecting unit 105 selects an SRS generation method will be described later.

The SRS generating unit 106 generates a code sequence to be used as an SRS (e.g., a ZC sequence) in accordance with the SRS generation method (Generation Method 1 or Generation Method 2) input from the selecting unit 105 and the information that is input from the control-information holding unit 104 and necessary for SRS generation. The SRS generating unit 106 outputs, as an SRS, the generated code sequence to the resource allocating unit 107.

The resource allocating unit 107 maps the SRS (code sequence) input from the SRS generating unit 106, to the time/frequency resource included in the SRS resource information input from the control-information holding unit 104 and outputs the resulting signal to the radio transmitting unit 108. The signal with the mapped SRS may be subjected to inverse fast Fourier transform (IFFT) (not shown).

The radio transmitting unit 108 performs D/A conversion and up-conversion on the signal input from the resource allocating unit 107 and transmits the resulting radio signal from the antenna 101 to the base station 200.

[Configuration of Base Station]

Figure 7:
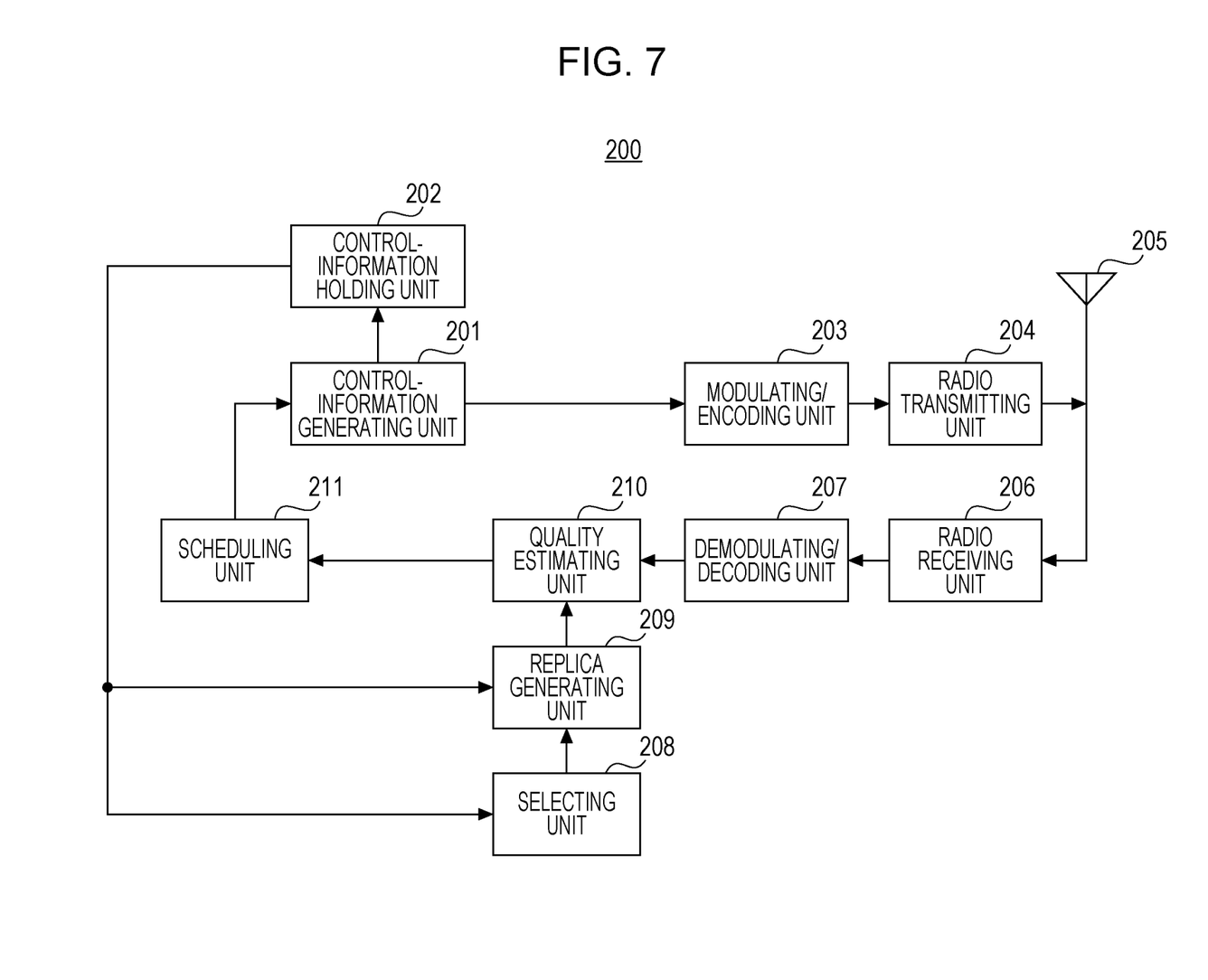
FIG. 7 illustrates a configuration of a base station.

FIG. 7 is a block diagram illustrating the configuration of the base station 200 according to the present embodiment. Referring to FIG. 7, the base station 200 includes a control-information generating unit 201, a control-information holding unit 202, a modulating/encoding unit 203, a radio transmitting unit 204, an antenna 205, a radio receiving unit 206, a demodulating/decoding unit 207, a selecting unit 208, a replica generating unit 209, a quality estimating unit 210, and a scheduling unit 211.

The control-information generating unit 201 generates, in accordance with an instruction from the scheduling unit 211 (which will be described later), a control signal for notifying the terminal 100 of SRS resource information and control information for deciding on an SRS transmission method (information similar to the above-mentioned control information received by the terminal 100) and outputs the signal to the control-information holding unit 202 and the modulating/encoding unit 203.

As mentioned above, it is not required that the entirety of the SRS resource information be provided to the terminal 100 all at once by the base station 200. Part of the quasi-static notification information (e.g., the SRS frequency hopping pattern, the frequency block size according to Generation Method 2, etc.) common to a plurality of terminals 100 may be provided, as cell-specific information, to the terminals 100 within the coverage of the base station 200. Downlink control information (DCI), medium access control (MAC) or radio resource control (RRC) information, or any combination thereof may be provided as the control information.

The control-information holding unit 202 holds the control information input from the control-information generating unit 201 and outputs the held control information to the selecting unit 208 and the replica generating unit 209, as required.

The modulating/encoding unit 203 modulates and encodes the control signal input from the control-information generating unit 201 and outputs the coded signal to the radio transmitting unit 204.

The radio transmitting unit 204 performs transmission processing such as D/A conversion, up-conversion, and amplification on the signal input from the modulating/encoding unit 203 and transmits, from the antenna 205 to the terminal 100, the radio signal obtained by the transmission processing.

The radio receiving unit 206 performs reception processing such as down-conversion and ND conversion on the signal received from the terminal 100 via the antenna 205 and outputs the resulting reception signal to the demodulating/decoding unit 207.

The demodulating/decoding unit 207 demodulates and decodes the reception signal input from the radio receiving unit 206 and outputs the decoded signal to the quality estimating unit 210.

The selecting unit 208 performs processing similar to the processing performed by the selecting unit 105 (FIG. 6) of the terminal 100. That is, the selecting unit 208 selects an SRS generation method to be adopted, that is, Generation Method 1 (Alt-1) or Generation Method 2 (Alt-2) described above, on the basis of the control information input from the control-information holding unit 202 and outputs information specifying the selected generation method to the replica generating unit 209.

The replica generating unit 209 generates, as a replica signal and in accordance with the SRS generation method input from the selecting unit 208 and the information that is input from the control-information holding unit 202 and necessary for SRS (code sequence) generation, a sequence (e.g., a ZC sequence) identical to the SRS code sequence generated as an SRS in the terminal 100. The replica generating unit 209 outputs the generated replica signal to the quality estimating unit 210.

The quality estimating unit 210 retrieves, on the basis of the SRS resource information provided to the terminal 100, the SRS reception signal from the decoded signal input from the demodulating/decoding unit 207. Then, the quality estimating unit 210 calculates a quality estimation value from the result of computing the correlation between the retrieved SRS reception signal and the replica signal input from the replica generating unit 209. The quality estimating unit 210 outputs, to the scheduling unit 211, the quality estimation result obtained by the calculation.

The scheduling unit 211 performs data scheduling (e.g., modulation and coding scheme (MCS) settings, frequency resource allocation, transmission power control, etc.) on the basis of the quality estimation result input from the quality estimating unit 210. Furthermore, the scheduling unit 211 determines the SRS resource information for the individual terminals 100 in consideration of frequencies allocated for the data and outputs the determined SRS resource information to the control-information generating unit 201.

[Operation of Terminal 100 and Base Station 200]

The following describes in detail the operation of the terminal 100 and the base station 200 that have the configurations described above.

Figure 8:
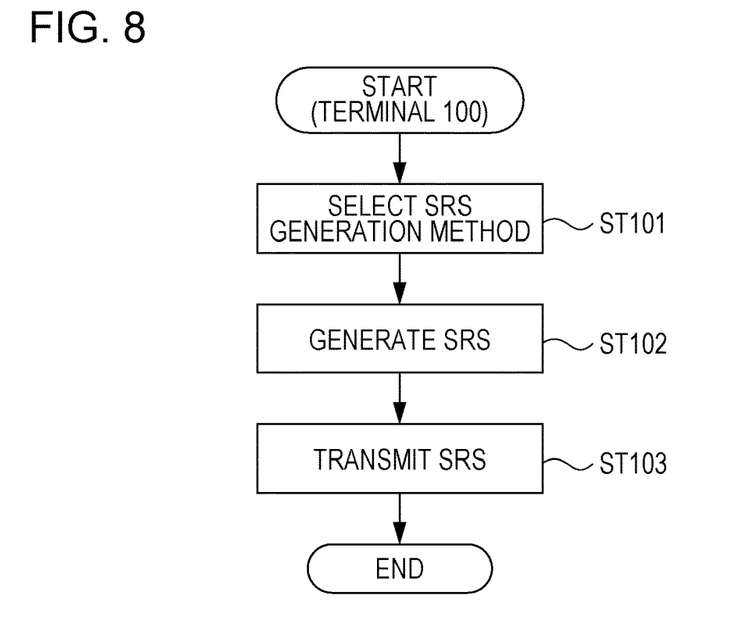
FIG. 8 illustrates an example of the operation of the terminal.
Figure 9:
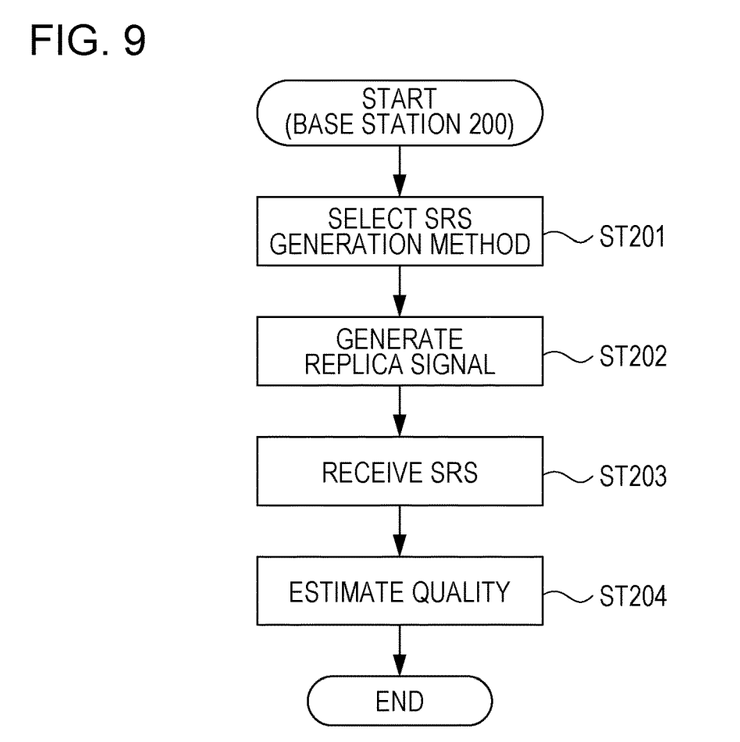
FIG. 9 illustrates an example of the operation of the base station.

FIG. 8 is a flowchart of the operation of the terminal 100 (FIG. 6), and FIG. 9 is a flowchart of the operation of the base station 200 (FIG. 7).

The terminal 100 selects a method for generating SRSs to be transmitted to the base station 200 (ST 101). Then, the terminal 100 generates an SRS in accordance with the selected generation method (ST 102) and transmits the generated SRS to the base station 200 (ST 103).

Meanwhile, the base station 200 selects an SRS generation method to be used in the terminal 100 (ST 201). Then, the base station 200 generates a replica signal in accordance with the selected generation method (ST 202). The base station 200 receives the SRS transmitted from the terminal 100 (ST 203) and estimates the uplink quality by using the received SRS and the generated replica signal (ST 204).

[Procedure for Selecting SRS Generation Method]

The following describes in detail the procedure by which the terminal 100 (the selecting unit 105) selects an SRS generation method and by which the base station 200 (the selecting unit 208) selects a replica-signal generation method (i.e., the processing in ST 101 and in ST 201).

With the option of Generation Method 1 (Alt-1) or Generation Method 2 (Alt-2) in each NR carrier, the terminal 100 and the base station 200 individually select one generation method, that is, Generation Method 1 or Generation Method 2, for each NR carrier and transmit an SRS in accordance with the selected generation method.

For example, the terminal 100 and the base station 200 individually select an SRS generation method suitable to the condition, settings, etc. of the terminal 100 so that the sounding performance attained by using SRSs (the capability to estimate quality with high accuracy and low delay in a broader band) may be improved.

The following describes, as an example, the procedure by which the base station 200 specifies an SRS generation method to be used in the terminal 100 and notifies the terminal 100 of the specified generation method. Selection Procedures #1 and #2 by which the base station 200 selects an SRS generation method (Generation Method 1 or Generation Method 2) will be individually described below.

<Selection Procedure #1>

The base station 200 selects an SRS generation method on the basis of the power headroom (PHR: surplus transmission power) or the path-loss level of the terminal 100. The PHR or the path-loss level is reported, for example, from the terminal 100 to the base station 200 at regular time intervals.

Specifically, when the PHR of the terminal 100 is less than a predetermined threshold value or the path-loss level of the terminal 100 is not less than a predetermined threshold value, the base station 200 determines that the terminal 100 is a terminal short of transmission power (a power-limited terminal). Then, the base station 200 selects, for the power-limited terminal, Generation Method 1 (see FIG. 1), which is advantageous in that the CM/PAPR is low.

When the PHR of the terminal 100 is not less than the predetermined threshold value or the path-loss level is less the predetermined threshold value, that is, when the terminal 100 is not a power-limited terminal (the terminal 100 is a non-power-limited terminal), the base station 200 selects Generation Method 2 (see FIG. 2), which is advantageous in that the degree of flexibility in frequency scheduling is high. Such a non-power-limited terminal has surplus transmission power and thus does not need to regulate the maximum transmission power even if the CM/PAPR is high due to the adoption of Generation Method 2, and the problems associated with Generation Method 2 (a decrease in the maximum transmission power and an increase in power consumption) are insignificant.

With Selection Procedure #1, selecting the suitable SRS generation method in accordance with the PHR or the path-loss level (i.e., tolerance to the high CM/PAPR) of the terminal 100 thus enables an improvement in the sounding performance attained by using SRSs.

<Selection Procedure #2>

The base station 200 selects an SRS generation method on the basis of category/capability (UE category/capability) information of the terminal 100. For example, the terminal 100 notifies the base station 200 of the category/capability information of the terminal 100 when the terminal 100 is connected thereto.

The following describes an example in which the transmission bandwidth available for the transmission from the terminal 100 is adopted as the category/capability of the terminal 100.

Specifically, in a case where the transmission bandwidth available for the transmission from the terminal 100 is wide, the terminal 100 transmits SRSs having wide transmission bandwidths, and thus frequent occurrence of frequency multiplexing of some bands between SRSs transmitted by the terminal 100 and SRSs transmitted by another terminal is anticipated. In a case where the transmission bandwidth available for the transmission from the terminal 100 is narrow, the terminal 100 is conceivably a terminal that performs processing at low cost and at low power consumption (a low-cost terminal).

Thus, when the transmission bandwidth available for the transmission from the terminal 100 is not less than a predetermined threshold value, the base station 200 places more weight on the flexibility in frequency scheduling and selects Generation Method 2 (see FIG. 2) accordingly. When the transmission bandwidth available for the transmission from the terminal 100 is less than the predetermined threshold value, the base station 200 places more weight on lower power consumption and a longer battery life and selects Generation Method 1 (see FIG. 1) accordingly.

With Selection Procedure #2, selecting the suitable SRS generation method in accordance with the category/capability (e.g., the transmission bandwidth) of the terminal 100 thus enables improvement in the sounding performance attained by using SRSs. The category/capability information of the terminal 100 is not limited to the transmission bandwidth available for the transmission from the terminal 100 and may be another parameter.

Selection Procedures #1 and #2 by which the base station 200 selects an SRS generation method have been described so far.

[Procedure for Providing Notification of SRS Generation Method]

The following describes procedures for notifying the terminal 100 of the SRS generation method decided by the base station 200.

<Explicit Notification of SRS Generation Method>

The base station 200 incorporates the selected SRS generation method type, that is, Generation Method 1 (Alt-1) or Generation Method 2 (Alt-2) into any one of the DCI, the MAC, and the RRC to explicitly notify the terminal 100 of the selected SRS generation method.

The terminal 100 retrieves the SRS generation method type from the control information provided by the terminal 200 and generates an SRS in accordance with the specified SRS generation method.

<Implicit Notification of SRS Generation Method>

The SRS generation method types including Generation Method 1 (Alt-1) and Generation Method 2 (Alt-2) are uniquely correlated, in accordance with a predetermined rule, with setting information or control information different from the SRS generation method types, and the mutual relationship is shared by the terminal 100 and the base station 200.

Then, the base station 200 notifies the terminal 100 of the setting information or the control information correlated with the selected SRS generation method type, that is, Generation Method 1 or Generation Method 2, to implicitly notify the terminal of the selected SRS generation method type.

On the basis of the setting information or the control information provided by the base station 200, the terminal 100 identifies the SRS generation method type correlated in accordance with the predetermined rule and then generates an SRS in accordance with the identified SRS generation method.

Such implicit notification of the SRS generation method type from the base station 200 to the terminal 100 enables a reduction in the amount of signaling needed to provide notification of the SRS generation method.

The following describes an example rule for correlating the SRS generation method types with the setting information or the control information.

(Solution 1)

According to Solution 1, the frequency resource information associated with SRS transmission is uniquely correlated with the SRS generation method types.

For NR, consideration is underway regarding supporting, as the NR carrier, a system bandwidth wider than the system bandwidths of LTE/LTE-Advanced. This approach is accompanied by the possibility that the SRS transmission is controlled in units of "partial bands" or "bandwidth parts" into which the system bandwidth of the NR carrier is divided.

Solution 1-1 thus involves correlating frequency resources including the partial bands with the SRS generation method types.

(Solution 1-1)

For example, partial band numbers are correlated with the SRS generation method types.

One partial band may be better suitable than another partial band for SRS transmission depending on the state of communication or the category/capability of each terminal. Thus, the number of terminals that transmit SRSs conceivably differs from one partial band to another. The flexibility in SRS frequency scheduling is more important when a larger number of terminals are involved.

This may be addressed in such a manner that the base station 200 decides, on the basis of the number of terminals 100 assigned to each partial band of interest, on a method for generating SRSs to be transmitted in the partial band concerned. Specifically, partial bands (partial band numbers) where the number of terminals that transmit SRSs is not less than a predetermined threshold value are correlated with Generation Method 2 (Alt-2), and partial bands (partial band numbers) where the number of terminals that transmit SRSs is less than the predetermined threshold value are correlated with Generation Method 1 (Alt-1).

The terminals 100 and the base station 200 share the mutual relationship between the SRS generation method types and the partial band numbers.

With reference to the number of terminals assigned to each partial band of interest in the NR carrier, partial bands in which more weight needs to be placed on the CM/PAPR property are correlated with Generation Method 1 and partial bands in which more weight needs to be placed on the flexibility in frequency scheduling are correlated with Generation Method 2. This approach enables each terminal 100 to select, for a partial band of interest in the NR carrier for SRS transmission, an SRS generation method with consideration given to the number of terminals that transmit SRSs in the partial band concerned and to transmit SRSs accordingly, and thus the sounding performance associated with SRSs may be improved.

(Solution 1-2)

Figure 10:
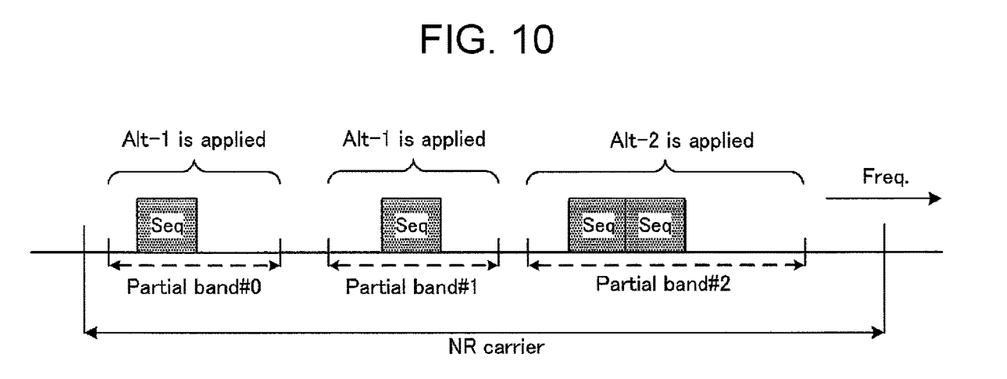
FIG. 10 illustrates an example in which the SRS generation methods are correlated with the bandwidths of partial bands.

For example, the bandwidths of the partial bands may be correlated with the SRS generation method types. FIG. 10 illustrates an example in which the bandwidths of the partial bands are correlated with the SRS generation method types.

When the bandwidth of a given partial band is wide, the SRS transmission bandwidth provided in the partial band is also wide. In such a case, frequent occurrence of frequency multiplexing of some bands between SRSs transmitted by the terminal 100 and SRSs transmitted by another terminal is anticipated.

Thus, partial bands (e.g., Partial Band #2 in FIG. 10) having a bandwidth wider than a threshold value are correlated with Generation Method 2 (Alt-2), with more weight placed on the flexibility in frequency scheduling. Meanwhile, partial bands having a bandwidth less than the threshold value are correlated with Generation Method 1 (Alt-1), with more weight placed on the CM/PAPR property.

This approach enables the terminal 100 to select the suitable SRS generation method in accordance with the bandwidth of the partial band concerned for the SRS transmission and to transmit SRSs accordingly, and thus the sounding performance associated with SRSs may be improved.

(Solution 1-3)

Placement of SRSs at predetermined subcarrier spacings referred to as "combs" is under consideration for NR, as has been implemented in LTE. Thus, comb numbers (e.g., comb numbers 1 to 4 for a subcarrier spacing of 4) may be correlated with the SRS generation method types.

In some cases, a plurality of terminals which differ from one another in the state of communication or the category/capability are placed in the same partial band. As described above, Generation Method 2 (Alt-2) is suitable for terminals capable of transmitting SRSs with wide transmission bandwidths or to non-power-limited terminals, whereas Generation Method 1 (Alt-1) is suitable for terminals that transmit SRSs with narrow transmission bandwidths or to power-limited terminals.

For each partial band of interest, the base station 200 may accordingly determine which combs are to be correlated to Generation Method 1 and which combs are to be correlated with Generation Method 2 in accordance with the ratio of the number of terminals to which Generation Method 1 is suitable to the number of terminals to which Generation Method 2 is suitable.

Figure 11:
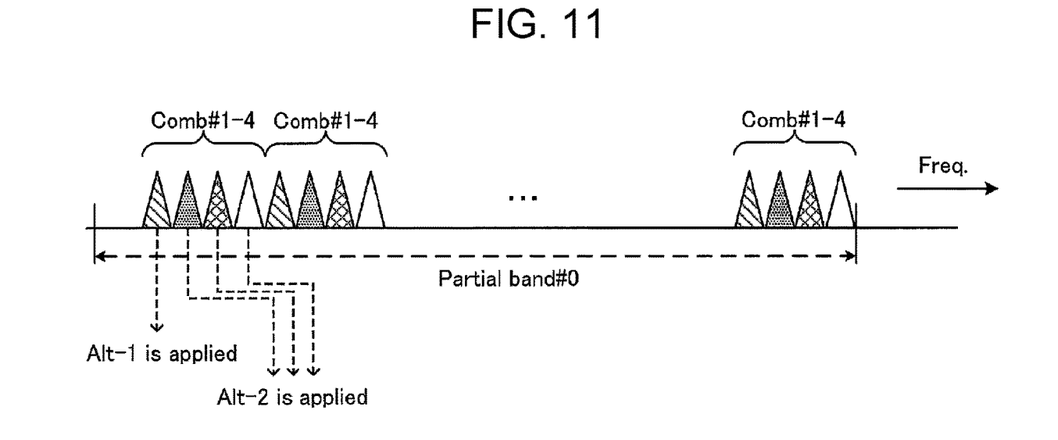
FIG. 11 illustrates an example in which the SRS generation methods are correlated with combs.

FIG. 11 illustrates an example in which the comb numbers are correlated with the SRS generation method types. In FIG. 11, a subcarrier spacing of 4 is provided with Comb #1 to Comb #4 assigned thereto. In a case where the ratio of the number of terminals to which Generation Method 1 (Alt-1) is suitable to the number of terminals to which Generation Method 2 (Alt-2) is suitable is 1:3, Comb #1 is correlated with Generation Method 1 and Comb #2 to Comb #4 are correlated with Generation Method 2, as illustrated in FIG. 11. The comb numbers correlated with Generation Method 1 and the comb numbers correlated with Generation Method 2 are not limited to the examples illustrated in FIG. 11.

The terminals 100 and the base station 200 share (the rules concerning) the mutual relationship between the individual comb numbers and the SRS generation method types. For example, the base station 200 may provide, as cell common information, (the rules concerning) the mutual relationship between the individual comb numbers and the SRS generation method types to the terminals 100 within the cell of the base station 200.

Thus, for the individual terminals 100 connected to the base station 200, even within the same partial band, different SRS generation methods may be selected in accordance with which comb is to be used.

With Solution 1, adopting the suitable SRS generation method in accordance with the communication status or the category/capability of the terminal of interest that transmits SRSs in the partial band concerned thus enables improvement in the sounding performance associated with SRSs.

(Solution 2)

According to Solution 2, types or intended uses of SRSs are uniquely correlated with the SRS generation method types.

(Solution 2-1)

According to Solution 2-1, SRS types are uniquely correlated with the SRS generation method types.

NR conceivably adopts, as SRSs, two SRS types: "periodic SRSs", that is, SRSs periodically transmitted under notified or prescribed rules; and "aperiodic SRSs", that is, SRSs transmitted a predetermined number of times (e.g., once) in response to triggers provided by the base station.

These SRS types (the aperiodic SRSs and the periodic SRSs) are correlated with the SRS generation method types as described below.

The flexibility in frequency scheduling is important for the aperiodic SRSs, which necessitate instant estimation of the quality of desired transmission bands. Accordingly, the aperiodic SRSs are correlated with Generation Method 2 (Alt-2).

In contrast, the flexibility in frequency scheduling is not important for the periodic SRSs, to which long-term frequency resources are allocated. Thus, the periodic SRSs are correlated with Generation Method 1 (Alt-1), with more weight placed on the CM/PAPR property.

This approach enables the terminal 100 to select the suitable SRS generation method in accordance with the SRS type concerned and to transmit SRSs accordingly, and thus the sounding performance associated with SRSs may be improved.

(Solution 2-2)

According to Solution 2-2, intended uses of SRSs may be uniquely correlated with the SRS generation method types.

For NR, consideration is underway regarding adopting "CSI-measurement SRSs" intended for use in estimating the uplink quality (channel state information (CSI)) in each given band and "beam-control SRSs" intended for use in controlling transmission beams of terminals.

The flexibility in frequency scheduling is important for the CSI-measurement SRSs, which necessitate instant estimation of the quality of desired transmission bands. Accordingly, the CSI-measurement SRSs are correlated with Generation Method 2 (Alt-2).

Meanwhile, the beam-control SRSs are intended for use in control which enables the base station to select an optimum beam from among a plurality of beams transmitted to a given band by the terminal of interest. None of the terminals need to transmit such a beam-control SRS to a wide band and thus the flexibility in frequency scheduling is insignificant. Accordingly, the beam-control SRSs are correlated with Generation Method 1 (Alt-1), with more weight placed on the CM/PAPR property.

This approach enables the terminal 100 to select the suitable SRS generation method in accordance with the intended use of SRSs concerned and to generate SRSs accordingly, and thus the sounding performance associated with SRSs may be improved.

(Solution 3)

According to Solution 3, service types are uniquely correlated with the SRS generation method types.

To support services of different specifications (enhanced mobile broadband (eMBB), ultra-reliable and low latency communications (URLLC), and (massive machine type communications (mMTC)), NR supports different subcarrier spacings (hereinafter referred to as "SCSs") or different frame formats for different services.

URLLC is a service expected to provide low-latency radio communication with added features of increased reliability. Thus, SRSs for use in URLLC (URLLC-service SRSs) necessitate instant and accurate estimation of the quality of desired transmission bands. Accordingly, the URLLC-service SRSs are correlated with Generation Method 2 (Alt-2), with more weight placed on the flexibility in frequency scheduling.

Meanwhile, the requirement for low latency in eMBB and mMTC is not as high as in URLLC. Thus, SRSs for use in eMBB and SRSs for use in mMTC are correlated with Generation Method 1 (Alt-1), with more weight placed on the CM/PAPR property.

Also, eMBB is expected to provide high-speed, large-capacity communication and thus conceivably use wide transmission bandwidths to carry out communication. Accordingly, SRSs for eMBB may be correlated with Generation Method 2 (Alt-2), which offers a higher degree of flexibility in frequency scheduling.

This approach enables the terminal 100 to select the suitable SRS generation method in accordance with the service type concerned and to generate SRSs accordingly, and thus the sounding performance associated with SRSs may be improved.

In place of the above-mentioned service types, SCSs may be uniquely correlated with the SRS generation method types.

In NR, the individual service types are conceivably provided with their respective SCS settings, for example, SCS in URLLC: 60 kHz; SCS in eMBB: 15 kHz; and SCS in mMTC: 15 kHz.

When the SCS specified for the terminal 100 is not less than a predetermined threshold value (e.g., 60 kHz), the terminal 100 and the base station 200 may select Generation Method 2 (Alt-2). When the SCS specified for the terminal 100 is less than the predetermined threshold value, the terminal 100 and the base station 200 may select Generation Method 1 (Alt-1).

This approach of adopting either one of the SRS generation methods in accordance with the SCS enables adoption of SRSs suitable to the service type concerned, and thus the sounding performance associated with SRSs may be improved.

In place of the above-mentioned service types, the frame format types may be uniquely correlated with the SRS generation method types.

For NR, consideration is underway regarding adopting, as a frame format (time frame configuration) for achieving low-latency features of URLLC, a "self-contained frame", which is a time unit of a certain duration of time (e.g., 1 slot or a fixed time length (1 ms)) and includes a "downlink transmission region", a "guard region (a non-transmission period or a gap period)", and an "uplink transmission region".

When the frame format associated with the SRS transmission from the terminal 100 is the self-contained frame, the terminal 100 and the base station 200 may select Generation Method 2 (Alt-2). When the frame format associated with the SRS transmission from the terminal 100 is not the self-contained frame, the terminal 100 and the base station 200 may select Generation Method 1 (Alt-1).

This approach of adopting either one of the SRS generation methods in accordance with the frame format enables adoption of SRSs suitable to the service type concerned, and thus the sounding performance associated with SRSs may be improved.

Parameters to be used for the individual service types are not limited to the SCSs or the frame format types and may be other parameters (e.g., terminal categories).

The example rule for correlating the SRS generation method types with the setting information or the control information has been described so far. The rule for establishing relationships with the SRS generation methods that has been described above in Solutions 1 to 3 may be determined for each base station 200 or may be prescribed by the specifications.

In the present embodiment, the terminal 100 selects one generation method from a plurality of generation methods for SRSs and transmits SRSs generated in accordance with the selected generation method, as described above. This enables the terminal 100 to make appropriate selection of SRS generation methods in a manner so as to reflect the communication status, the setting information, or the like of the terminal 100 and the features offered by the individual SRS generation methods, that is, the CM/PAPR and the flexibility in frequency scheduling. The present embodiment thus enables the terminal 100 to generate SRSs appropriately and to transmit the SRSs accordingly.

An embodiment of the present disclosure has been described so far.

Alternatively, Generation Method 1 (Alt-1) and Generation Method 2 (Alt-2) described above may be defined as follows, where effects similar to those of the above-mentioned embodiment may be attained. The wording "one ZC sequence" herein refers to a ZC sequence calculated with one sequence length, one sequence number, and one CS number.

Generation Method 1: An SRS is generated by using one ZC sequence.

Generation Method 2: An SRS is generated by concatenating one or more ZC sequences.

Generation Method 2: An SRS is generated by using subsequences of one ZC sequence calculated from the sequence length greater than or equal to the SRS transmission band.

Generation Method 1: The sequence length of a ZC sequence to be used as an SRS corresponds to the transmission bandwidth of the SRS.

Generation Method 2: The sequence length of a ZC sequence to be used as an SRS does not correspond to the transmission bandwidth of the SRS.

Although the embodiment above describes that the base station 200 takes the initiative in deciding on an SRS generation method, the terminal 100 may take the initiative in deciding on (selecting) an SRS generation method. When this is the case, the terminal 100 may explicitly or implicitly notify the base station 200 of the selected SRS generation method.

The embodiment, which has been described above by taking SRSs as an example, is also applicable to reference signals generated by using code sequences such as demodulation reference signals (DM-RSs) and channel state information reference signals (CSI-RSs).

The embodiment described above is applicable not only to SRSs but also to other channels in which code sequences such as ZC sequences are used.

Although the embodiment above describes that two methods, that is, Generation Method 1 (see FIG. 1) and Generation Method 2 (see FIG. 2), are adopted as SRS generation methods, other SRS generation methods may be adopted, and three or more generation methods may be adopted.

The present disclosure can be realized by software, hardware, or a combination of software and hardware cooperating with each other. Each functional block referred to in the description of the embodiment may be realized in part or in its entirety as an LSI, which is an integrated circuit, and each process described with regard to the embodiment may be controlled in part or in its entirety by one LSI or a combination of LSIs. Such an LSI may be individually formed as chips or one chip may be formed so as to include part or the entirety of the relevant functional block. LSIs may be provided for input and output of data. Depending on the degree of integration, LSIs may also be referred to as ICs, system LSIs, super LSIs, or ultra LSIs. The technique for circuit integration is not limited to LSIs, and dedicated circuitry, general purpose processors, or dedicated processors may be used for implementation. It is also possible to use a field-programmable gate array (FPGA) in which an LSI can be programmed after being manufactured or a reconfigurable processor in which connections and settings of circuit cells within a manufactured LSI can be reconfigured. The present disclosure may be realized as digital processing or analog processing. Furthermore, if another integrated circuit technology becomes available as a replacement for LSIs owing to the advancement of semiconductor technology or other derivative technologies, it is certainly possible to use such a technology to integrate functional blocks. Biotechnology is potentially adoptable.

A terminal according to the present disclosure includes: a circuit configured to select one generation method from a plurality of generation methods for reference signals; and a transmitter configured to transmit the reference signals generated in accordance with the selected generation method.

In the terminal of the present disclosure, the circuit selects the one generation method in accordance with power headroom of the terminal or a path-loss level of the terminal.

In the terminal of the present disclosure, the circuit selects the one generation method in accordance with a transmission bandwidth of the terminal.

In the terminal of the present disclosure, the circuit selects the one generation method uniquely correlated with a parameter associated with a frequency resource for use in transmission of the reference signals.

In the terminal of the present disclosure, the parameter includes the number of terminals that transmit the reference signals in a partial band obtained by dividing a system band, a bandwidth of the partial band, or combs constituting the partial band.

In the terminal of the present disclosure, the circuit selects the one generation method in accordance with a type of the reference signals.

In the terminal of the present disclosure, the circuit selects the one generation method in accordance with a type of a service performed by the terminal.

In the terminal of the present disclosure, the circuit selects the one generation method in accordance with a subcarrier spacing specified for the terminal.

In the terminal of the present disclosure, the circuit selects the one generation method in accordance with a frame format type specified for the terminal.

In the terminal of the present disclosure, the plurality of generation methods include a first generation method by which a reference signal is generated by using one code sequence and a second generation method by which a reference signal is generated by concatenating one or more code sequences.

A communication method according to the present disclosure includes: selecting one generation method from a plurality of generation methods for reference signals; and transmitting the reference signals generated in accordance with the selected generation method.

One embodiment of the present disclosure is useful for mobile communication systems.

REFERENCE SIGNS LIST

100 Terminal
101, 205 Antenna
102, 206 Radio Receiving Unit
103, 207 Demodulating/Decoding Unit
104, 202 Control-Information Holding Unit
105, 208 Selecting Unit
106 SRS Generating Unit
107 Resource Allocating Unit
108, 204 Radio Transmitting Unit
200 Base Station
201 Control-Information Generating Unit
203 Modulating/Encoding Unit
209 Replica Generating Unit
210 Quality Estimating Unit
211 Scheduling Unit

The invention claimed is:

1. A terminal comprising:
  circuitry, which, in operation,
    determines a number of terminals which transmit reference signals in a partial band of a system band;
    in response to the number of terminals being less than a threshold value, selects one generation method from a plurality of generation methods for reference signals, the plurality of generation methods including a first generation method by which each of the reference signals is generated by using one code sequence and a second generation method by which each of the reference signals is generated by concatenating one or more code sequences, and
    in response to the number of terminals being not less than the threshold value, selects another generation method from the plurality of generation methods; and
  a transmitter, which, in operation, transmits the reference signals generated in accordance with the selected generation method.

2. The terminal according to claim 1, wherein the circuitry, in operation, selects the generation method in accordance with power headroom of the terminal or a path-loss level of the terminal.

3. The terminal according to claim 1, wherein the circuitry, in operation, selects the one generation method in accordance with a transmission bandwidth of the terminal.

4. The terminal according to claim 1, wherein the circuitry, in operation, selects the generation method in accordance with a type of the reference signals.

5. The terminal according to claim 1, wherein the circuitry, in operation, selects the generation method in accordance with a type of a service performed by the terminal.

6. The terminal according to claim 1, wherein the circuitry, in operation, selects the generation method in accordance with a subcarrier spacing specified for the terminal.

7. The terminal according to claim 1, wherein the circuitry, in operation, selects the generation method in accordance with a frame format type specified for the terminal.

8. A communication method comprising:
  determining a number of terminals which transmit reference signals in a partial band of a system band;
  in response to the number of terminals being less than a threshold value, selecting one generation method from a plurality of generation methods, the plurality of generation methods including a first generation method by which each of the reference signals is generated by using one code sequence and a second generation method by which each of the reference signals is generated by concatenating one or more code sequences, and
  in response to the number of terminals being not less than the threshold value, selecting another generation method from the plurality of generation methods; and
  transmitting the reference signals generated in accordance with the selected generation method.

9. The communication method according to claim 8, comprising selecting the generation method in accordance with power headroom or a path-loss level.

10. The communication method according to claim 8, comprising selecting the generation method in accordance with a transmission bandwidth.

11. The communication method according to claim 8, comprising selecting the generation method in accordance with a type of the reference signals.

12. The communication method according to claim 8, comprising selecting the generation method in accordance with a type of a service.

13. The communication method according to claim 8, comprising selecting the generation method in accordance with a subcarrier spacing.

14. The communication method according to claim 8, comprising selecting the generation method in accordance with a frame format type.

* * * * *